(12) United States Patent
Hesse et al.

(10) Patent No.: US 8,276,930 B1
(45) Date of Patent: Oct. 2, 2012

(54) TOW BAR HAVING MULTIPLE INTERCHANGEABLE TOWING ASSEMBLIES

(75) Inventors: Jay Hesse, Pender, NE (US); Neil Wagner, Winside, NE (US); Douglas Prokop, Thurston, NE (US)

(73) Assignee: Automatic Equipment Manufacturing Company

( * ) Notice: Subject to any disclaimer, the term of this patent is extended or adjusted under 35 U.S.C. 154(b) by 0 days.

(21) Appl. No.: 13/374,550

(22) Filed: Jan. 3, 2012

(51) Int. Cl.
*B60D 1/00* (2006.01)
(52) U.S. Cl. ........................................ 280/504; 280/477
(58) Field of Classification Search .................. 280/504, 280/415.1, 416.1, 416.3, 477, 478.1, 479.2, 280/479.3, 491.1, 498, 495, 499, 511, 515
See application file for complete search history.

(56) References Cited

U.S. PATENT DOCUMENTS

| | | | | |
|---|---|---|---|---|
| 2,827,307 A * | 3/1958 | Osborn | ....................... | 280/416.3 |
| 2,968,494 A | 1/1961 | Klouda | | |
| 3,801,134 A | 4/1974 | Dees | | |
| 3,843,160 A * | 10/1974 | Frushour et al. | ........... | 280/416.1 |
| 3,951,434 A * | 4/1976 | Sause | ......................... | 280/416.1 |
| 4,248,450 A * | 2/1981 | McWethy | .................. | 280/416.1 |
| 4,280,713 A * | 7/1981 | Bruhn | ......................... | 280/416.1 |
| D281,489 S * | 11/1985 | Hancock | ...................... | D12/162 |
| 5,722,678 A | 3/1998 | Hunger | | |
| 5,725,229 A * | 3/1998 | McWethy | .................. | 280/416.1 |
| 5,839,744 A * | 11/1998 | Marks | ......................... | 280/416.1 |
| 7,347,440 B2 | 3/2008 | Shannon | | |
| 7,673,894 B2 * | 3/2010 | Bender | ...................... | 280/406.1 |
| 7,784,813 B2 | 8/2010 | Columbia | | |
| 7,862,066 B2 * | 1/2011 | Smith | ......................... | 280/416.1 |
| 7,926,829 B2 * | 4/2011 | Bender | ...................... | 280/406.1 |
| 7,959,180 B1 | 6/2011 | Huston et al. | | |
| 8,128,116 B1 * | 3/2012 | Huston et al. | ................. | 280/493 |
| 2008/0073872 A1 * | 3/2008 | Scott | ............................. | 280/477 |
| 2010/0207357 A1 | 8/2010 | Hathcock et al. | | |

* cited by examiner

*Primary Examiner* — Tashiana Adams
(74) *Attorney, Agent, or Firm* — Donald R. Schoonover

(57) ABSTRACT

A tow bar having a towing portion with multiple interchangeable towing assemblies each structured to be releasably connectable to towing vehicles having different types and/or sizes of towing hitch apparatus; a towed portion with a body member connected to a pair of rearwardly-extending legs each with a rear connector releasably connectable to a baseplate connector of a towed hitch apparatus of a towed vehicle, at least one of the legs being pivotally connected to the body member; an attaching portion structured to releasably connect each interchangeable towing assembly to the body member; and a storage mechanism structured to releasable secure the tow bar to a baseplate connector of the towed hitch apparatus of the towed vehicle.

8 Claims, 3 Drawing Sheets

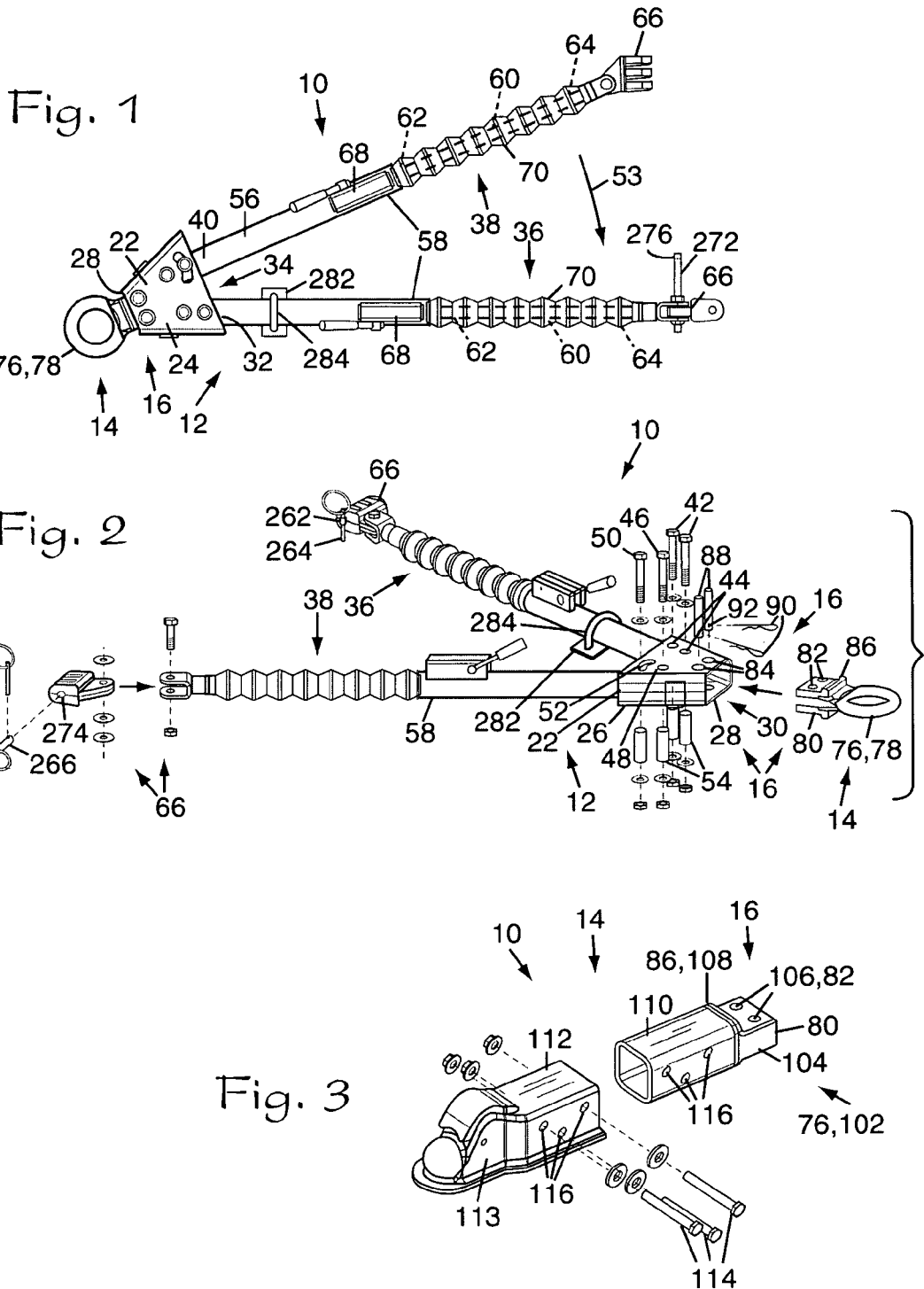

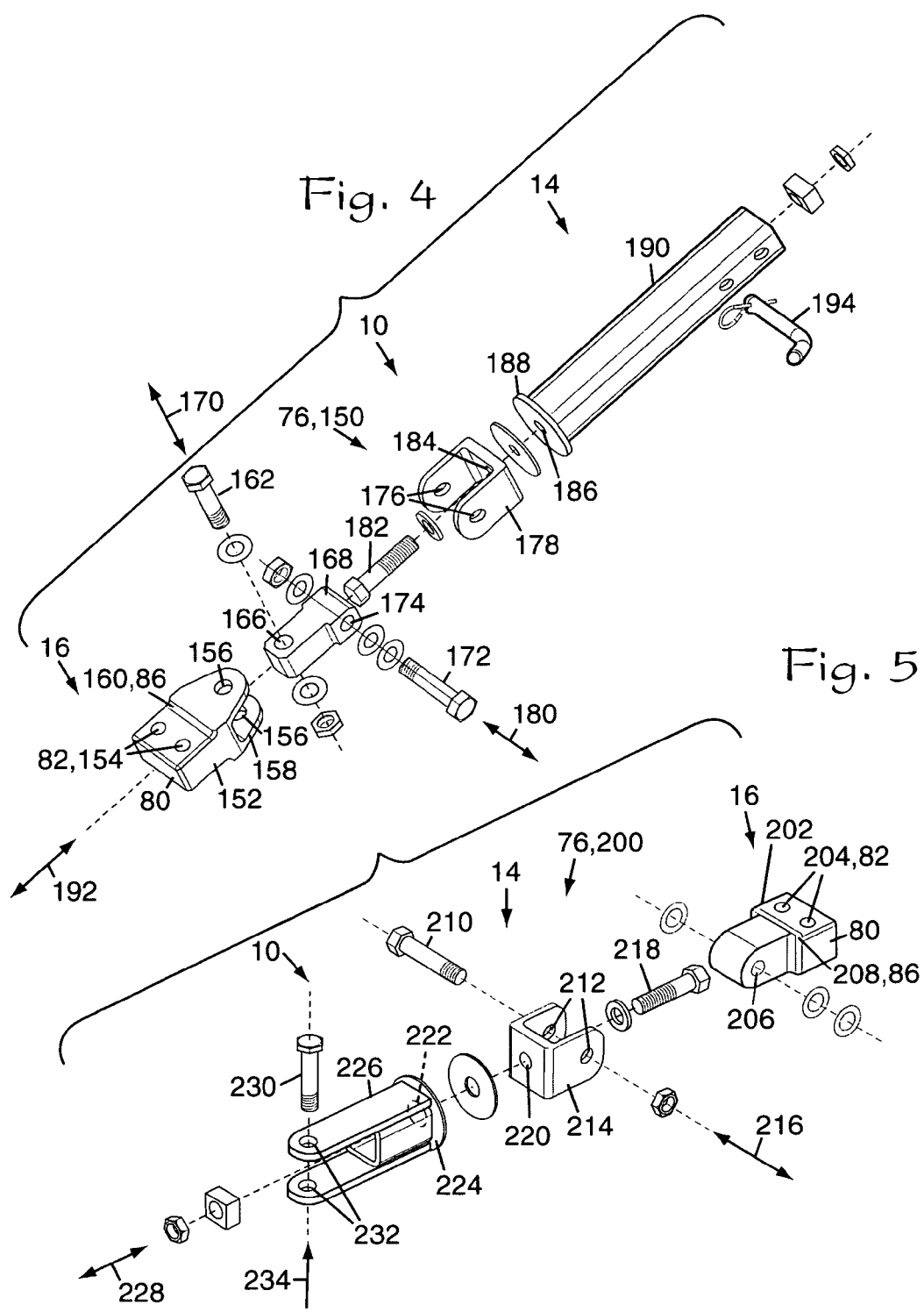

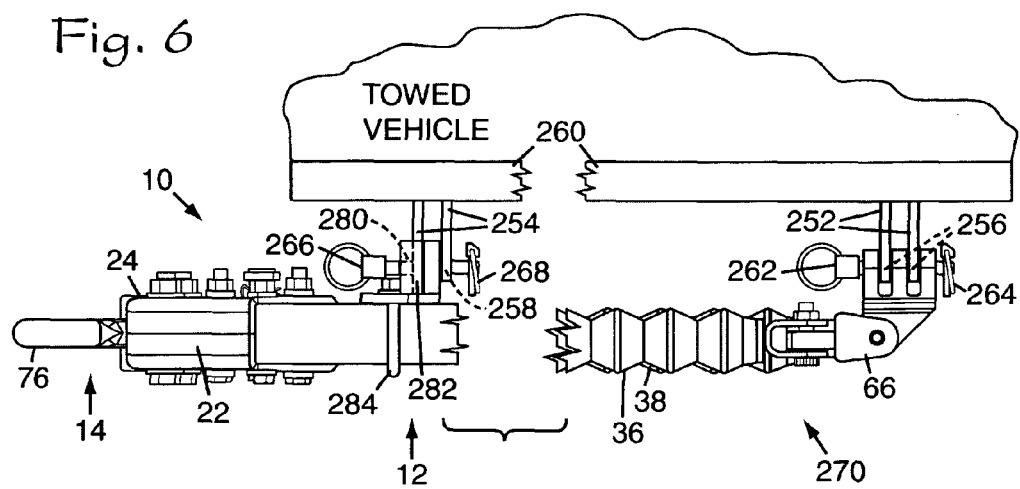
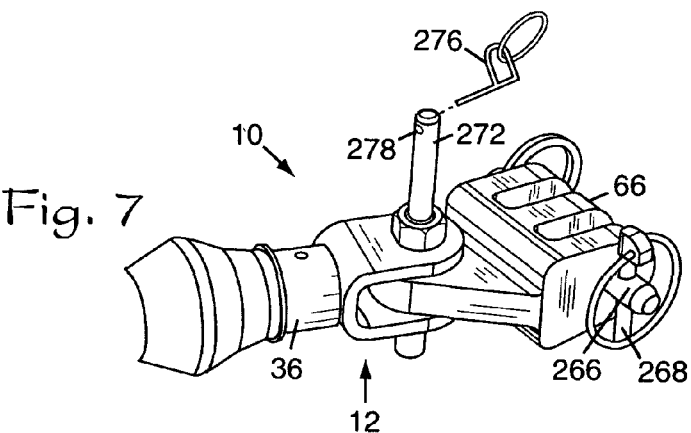
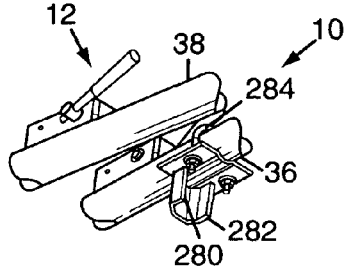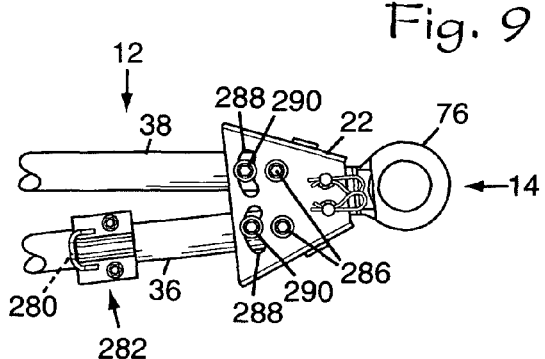

TOW BAR HAVING MULTIPLE INTERCHANGEABLE TOWING ASSEMBLIES

BACKGROUND OF THE INVENTION

1. Field of the Invention

The present invention relates generally to tow bars for towing a towed vehicle behind a towing vehicle having one of a plurality of different types of hitch connections.

2. Description of the Related Art

Prior art tow bars typically include a head pivotally or fixedly secured to a hitch component that is structured to be releasably connectable to a hitch apparatus of a towing vehicle. The head has a pair of rearwardly-extending tow bar legs which, in turn, are pivotally or fixedly secured to rear connectors that also are pivotally or fixedly connectable to a towed hitch apparatus of a towed vehicle; one of the tow bar legs may be pivotally connected to the head, whereas the other tow bar leg is fixedly secured to the head.

In other words, a prior art tow bar is typically an articulated apparatus having a head, which is releasably connectable to a towing hitch apparatus of a towing vehicle, but is not typically releasable from the remainder of the tow bar apparatus.

For some applications, a tow bar remains connected to the front of a towable vehicle or other equipment, sometimes referred to herein as a towed vehicle, so the vehicle or equipment can be towed, for example, from one construction site to another by any one of several different towing vehicles. The problem being that the various towing vehicles may not have the same type of hitch connection for connecting to the tow bar connected to the towed vehicle.

For example, the hitch connection of one towing vehicle may consist of a conventional receiver hitch for connecting to a square, forwardly-directed shank of a tow bar connected to the towed vehicle, whereas the hitch connection of another towing vehicle may consist of a hitch ball for connecting to a hitch ball receiver (there is more than one size of hitch ball) of a tow bar connected to the towed vehicle, or a pintle connection for connecting to a lunette ring of a tow bar connected to the towing vehicle, etc. It should be noted that this situation is further complicated by the fact that there are several different sizes of hitch balls, more than one size of square shanks for conventional receiver hitches, etc.

Various prior art attempts have been made in order to provide tow bars that can connect a towed vehicle to a variety of hitch connections of towing vehicles. For example, U.S. Pat. No. 2,827,307 granted Mar. 18, 1958 to Osborn, discloses a selective implement hitch which includes a flat body with four arms mounted to rotate about a vertically-oriented axis on a drawbar of a towing vehicle, each arm having a respective one of a hook; a hole for accommodating a pin, clevis or the like; a ball; or a loop.

Similarly, U.S. Pat. No. 2,968,494 granted Jan. 17, 1961 to Klouda, discloses a hitch device having a laterally-swinging hitch element wherein either a ring or a clevis-type connection extends forwardly from a draft arm of a towed vehicle for connecting to a towing vehicle.

Additionally, U.S. Pat. No. 3,801,134 granted Apr. 2, 1974 to Dees, discloses a multi-hitch element tow hitch construction wherein a plurality of differently-sized hitch balls are mounted on an adapter rotatable about a fore-to-aft horizontal axis.

Also, U.S. Pat. No. 3,951,434 granted Apr. 20, 1976 to Sause, discloses a three-way trailer hitch wherein a trailer tongue has a socket for capturing a standard hitch ball and a hitch bar has a loop at one end, a clevis at the other end, and a hitch ball in the middle.

Also, U.S. Pat. No. 5,722,678, granted Mar. 3, 1998 to Hunger, discloses a trailer coupling assembly wherein a pivotable drawbar has an eye with a first inner diameter at one end thereof and another eye with a second inner diameter at the other end.

Also, U.S. Pat. No. 5,839,744, granted Nov. 24, 1998 to Marks, discloses a vehicle towing hitch having a plurality of differently-sized hitch balls mounted on the outside surfaces of a hollow rotatable polygonally-shaped tubular section, and a pintle telescopingly mounted in the hollow of the tubular section.

Also, U.S. Pat. No. 7,347,440, granted Mar. 25, 2008 to Shannon, discloses a trailer hitch having multiple hitch balls mounted on a rotatable plate of a trailer.

Also, U.S. Pat. No. 7,673,894, granted Mar. 9, 2010 to Bender, discloses a dual trailer hitch having a reversible trailer hitch body with multiple types of hitches at distal ends thereof.

Also, U.S. Pat. No. 7,784,813, granted Aug. 31, 2010 to Columbia, discloses a multi-task trailer hitch assembly having a plurality of receiving tubes for attachment of one or more hitch-mounted receiver-type accessories while also retaining a hitch ball.

Also, U.S. Pat. Appln. Publ. No. 2010/0207357, published Aug. 19, 2010 to Hathcock et al., discloses a coupler converter adapter having a first hitch mechanism for connection to a towed hitch apparatus of a vehicle to be towed and a second hitch mechanism for connection to a towing hitch apparatus of a towing vehicle.

What is needed is a tow bar having a front part that is releasably connectable to towing hitch apparatus of towing vehicles, wherein each towing hitch apparatus has a different type and/or size of connection.

What is also needed is a tow bar with a front part that is releasably connectable to a towing hitch apparatus of a towing vehicle, and is also releasably connectable to the remaining part of the tow bar having legs that are releasably connectable to a towed hitch apparatus of a towed vehicle.

What is further needed is a tow bar having a plurality of interchangeable towing assemblies, each interchangeable towing assembly being releasably connectable to a different type and/or size of towing hitch connection, wherein each interchangeable towing assembly is also releasably connectable to the remaining part of the tow bar having rearwardly-extending legs releasably connectable to a towed hitch apparatus of a towed vehicle.

SUMMARY OF THE INVENTION

The improvements of the present invention for a tow bar for connecting a towed hitch apparatus of a towed vehicle to a towing hitch apparatus of a towing vehicle include a towed portion structured and configured to be releasably connectable to a towed hitch apparatus of a towed vehicle, a towing portion structured and configured to be releasably connectable to a towing hitch apparatus of a towing vehicle, an attaching portion structured and configured to releasably connect each interchangeable towing assembly of the plurality of interchangeable towing assemblies to the body member of the towed portion, and a storage mechanism structured and configured to releasably connect the tow bar to a baseplate connector of the towed hitch apparatus of the towed vehicle in a stored configuration.

The towed portion includes a body member and a pair of legs. Each of the legs includes an outer member with a proximal end connected to the body member and a distal end. At least one of the outer members is pivotally connected to the body member. Each of the legs also includes an inner member with a proximal end telescopingly and longitudinally displaceable in the distal end of the outer member, and a distal end with a rear connector releasably connectable to the towed hitch apparatus of the towed vehicle.

The towing portion includes a plurality of interchangeable towing assemblies wherein each interchangeable towing assembly is structured and configured to be releasably connectable to a different type and/or size of towing hitch apparatus of a towing vehicle. The plurality of interchangeable towing assemblies include two or more of the following: an interchangeable towing assembly with a lunette ring configuration, an interchangeable towing assembly with a universal swivel clevis configuration, one or more interchangeable towing assemblies with a hitch ball receiver configuration, and one or more interchangeable towing assemblies with a universal swivel shank configuration. Each of the interchangeable towing assemblies is structured and configured to releasably connect the body portion of the towed portion to the towing hitch apparatus of the towing vehicle.

The attaching portion includes the body member having a front end with an opening, upper and lower sides, and at least one aligned pair of orifices through the upper and lower sides. The attaching portion also includes each interchangeable towing assembly having a rearwardly-extending coupler with at least one vertically-oriented orifice corresponding to the at least one aligned pair of orifices through the upper and lower sides of the body member, the coupler being dimensioned and profiled to be slidingly insertable through the front opening of the body member and into the body member, the coupler having a protrusion positioned wherein the at least one pair of orifices through the upper and lower sides of the body member and the at least one orifice of the coupler are aligned when the protrusion abuts the body member. The attaching portion further includes a pin, insertable through each at least one pair of orifices through the upper and lower sides of the body member when aligned with the at least one orifice of the coupler, to thereby releasably secure the coupler to the body member.

The storage mechanism includes a leg support structured to enable releasable connection of the distal ends of the legs to one tab of a baseplate connector of the towed hitch apparatus of the towed vehicle, and a storage bracket structured to enable releasable connection of the proximal ends of the legs to another tab of the baseplate connector of the towed hitch apparatus of the towed vehicle.

PRINCIPAL OBJECTS AND ADVANTAGES OF THE INVENTION

The principal objects and advantages of the present invention include providing a tow bar having a front part that is releasably connectable to towing hitch apparatus of towing vehicles, wherein each towing hitch apparatus has a different type or size of hitch connection; providing such a tow bar with a front part that is releasably connectable to a towing hitch apparatus of a towing vehicle, and is also releasably connectable to the remaining part of the tow bar having legs that are releasably connectable to a towed hitch apparatus of a towed vehicle; providing such a tow bar having a plurality of interchangeable towing assemblies, each interchangeable towing assembly being releasably connectable to a different type or size of hitch apparatus of a towing vehicle, wherein each interchangeable towing assembly is also releasably connectable to the remaining part of the tow bar having rearwardly-extending legs releasably connectable to a towed hitch apparatus of a towed vehicle; and generally providing such a tow bar that is reliable in performance, capable of long-lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

BRIEF DESCRIPTION OF THE DRAWING FIGURES

FIG. 1 is a top plan view of a tow bar having multiple interchangeable towing assemblies with an interchangeable towing assembly having a lunette ring configuration, according to the present invention.

FIG. 2 is an exploded perspective view of the tow bar having multiple interchangeable towing assemblies as shown in FIG. 1.

FIG. 3 is an enlarged and exploded perspective view of the tow bar having multiple interchangeable towing assemblies with an interchangeable towing assembly having a hitch ball receiver configuration.

FIG. 4 is an enlarged and exploded perspective view of the tow bar having multiple interchangeable towing assemblies with an interchangeable towing assembly having a universal swivel shank configuration.

FIG. 5 is an enlarged and exploded perspective view of the tow bar having multiple interchangeable towing assemblies with an interchangeable towing assembly having a universal swivel clevis configuration.

FIG. 6 is an enlarged and fragmentary side elevational view of the tow bar having multiple interchangeable towing assemblies stored in a stored configuration below a baseplate connector of a towed hitch apparatus of a towed vehicle.

FIG. 7 is a further enlarged and fragmentary perspective view of a rear connector showing a leg support structured to enable storage of the tow bar having multiple interchangeable towing assemblies in the stored configuration.

FIG. 8 is a fragmentary perspective view of a storage bracket of the tow bar having multiple interchangeable towing assemblies.

FIG. 9 is a fragmentary bottom plan view showing both legs pivotally mounted to a body member of the tow bar having multiple interchangeable towing assemblies, according to the present invention

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 generally refers to a tow bar having multiple interchangeable towing assemblies in accordance with the present invention as shown in FIGS. 1 through 9. The tow bar 10 includes a rear or towed portion 12 structured to be releasably connectable to a towed hitch apparatus of a towed vehicle, a front or towing portion 14 structured to be releasably connectable to a towing hitch apparatus of a towing vehicle, and an attaching portion 16 structured to releasably connect the towing portion 14 to the towed portion 12.

The towed portion 12 includes a body member 22, such as a weldment assembly 22 having generally trapezoidally-shaped upper and lower sides 24, 26, a front end 28 having an opening 30, and a rear end 32 having an opening 34, as shown in FIGS. 1 and 2.

The towed portion 12 also includes a pair of legs 36, 38 extending rearwardly from the body member 22. Each of the legs 36, 38 has a proximal end 40 connected to the body member 22 by fasteners—for example bolts, washers and nuts as appropriate, or other suitable connecting devices—as shown in FIG. 1. Preferably, one of the legs, such as leg 36 for example, may be fixedly secured to body member 22 wherein fasteners 42 are mounted through pairs of aligned orifices 44 (some orifices not shown) in upper and lower sides 24, 26 of body member 22.

One fastener 46 of the other leg 38 is mounted through a pair of aligned orifices 48 (one of the aligned orifices not shown) and the other fastener 50 is mounted through a pair of aligned arcuate slots 52 (one of the aligned arcuate slots not shown) to thereby allow leg 38 to be pivotable about forwardmost fastener 46, as indicated by the arrow designated by numeral 53, wherein leg 38 can be pivoted toward leg 36 to be positioned alongside fixed leg 36 for storage purposes as hereinafter described. The adjustability of one of the legs 36 or 38 enabled by the aligned arcuate slots 52 allows the tow bar 10 to be used with towed vehicles having baseplate connectors with different spacings between connections thereof. Preferably, a ferrule 54 encircles each of the fasteners between the upper and lower sides 24, 26 to thereby provide reinforcing and support to the upper and lower sides 24, 26 of body member 22.

Each of legs 36, 38 includes an outer member 56 with a distal end 58 and an inner member 60 with a proximal end 62 and a distal end 64. The proximal end 62 of each inner member 60 is telescopingly and longitudinally displaceable within the distal end 58 of its respective outer member 56. A rear connector 66 is connected to the distal end 64 of each inner member 60 to enable pivotal connection of the respective inner member 60 to a towed hitch apparatus of a towed vehicle.

The aligned arcuate slots 52 also allow the spacing between the rear connectors 66 of legs 36, 38 to be adjustable to thereby accommodate difference in spacing between tabs of baseplate connectors of different towed vehicles as hereinafter described.

A latch 68 is secured near the distal end 58 of each outer member 56 to enable releasable locking of the respective inner member 60 in a deployed configuration relative to its outer member 56 as disclosed and taught in U.S. Pat. No. 7,959,180, which disclosure and teachings are incorporated herein by reference. If desired, a flexible boot 70, constructed of rubber or other suitable material, may be used to enclose a portion of each inner member 60, which extends rearwardly from its respective outer member 56, to thereby protect that otherwise exposed portion of the inner member 60 from debris and contamination.

The towing portion 14 of tow bar 10 includes a plurality of interchangeable towing assemblies 76. One of the plurality of interchangeable towing assemblies 76 has a lunette ring configuration 78 as shown in FIGS. 1 and 2. Interchangeable lunette ring towing assembly 78 would be selected from the plurality of interchangeable towing assemblies 76 when a user desires to connect the tow bar 10 to a towing hitch apparatus having a pintle hitch (not shown).

The attaching portion 16 of tow bar 10 includes each interchangeable towing assembly 76 having a rearwardly-extending coupler 80 with one or more vertically-oriented orifices 82, the coupler 80 being dimensioned and profiled to be slidingly insertable through the front opening 30 and into body member 22. The attaching portion 16 also includes the body member 22 having a corresponding aligned pairs of orifices 84 through upper and lower sides 24, 26. Preferably, each interchangeable towing assembly 76 has a protrusion 86 spaced such that the orifices 82 are aligned with the corresponding orifices 84 when the protrusion 86 abuts the body member 22.

The attaching portion 16 of each of the interchangeable towing assemblies 76 further includes one or more pins 88, such as ⅝"-diameter pins 88 for example, slidably insertable through orifices 84 of the body member 22 while aligned with orifices 82 of coupler 80 to thereby secure a selected interchangeable towing assembly 76 to the body member 22. Pins 90 inserted through orifices 92 through distal ends of pins 88 secure pins 88 and the respective interchangeable towing assembly 76 to the body member 22.

The plurality of interchangeable towing assemblies 76 also includes an interchangeable towing assembly having a hitch ball receiver configuration 102 as shown in an exploded view in FIG. 3. Hitch ball receiver assembly 102 would be selected when a user desires to connect tow bar 10 to a towing hitch apparatus with a hitch ball (not shown). As existing hitch balls have a variety of different ball diameters, the plurality of interchangeable towing assemblies 76 may include several interchangeable hitch ball receiver assemblies 102, wherein each is structured to accommodate a different diameter of hitch ball that may be present in the towing hitch apparatus.

Alternatively, the tow bar 10 may include one interchangeable hitch ball receiver towing assembly 102 structured to accommodate a hitch ball having a particular diameter. In that event, the tow bar 10 could also include a hitch ball with that particular diameter, which could be used to temporarily replace the existing hitch ball of the towing hitch apparatus.

Interchangeable hitch ball receiver assembly 102 includes a rearwardly-extending coupler 104 with one or more vertically-oriented orifices 106, the coupler 104 being dimensioned and profiled to be slidingly insertable through front opening 30 and into body member 22. Preferably, interchangeable hitch ball receiver assembly 102 has a protrusion 108 spaced such that orifices 106 are aligned with the corresponding orifices 84 through the upper and lower sides 24, 26 when the protrusion 108 abuts body member 22. Coupler 104 may include a forwardly-extending extension 110 as shown in FIG. 3. A sleeve 112 of hitch ball receiver assembly 102 is structured to telescopingly mate with extension 110. Fasteners 114 through aligned orifices 116 secure sleeve 112 and extension 110 of interchangeable hitch ball receiver assembly 102 together as a unit.

The plurality of interchangeable towing assemblies 76 may also include a universal swivel shank configuration 150 as shown in an exploded view in FIG. 4. Universal swivel shank assembly 150 would be selected when a user desires to connect the tow bar 10 to a towing hitch apparatus with a conventional receiver hitch (not shown). As conventional receiver hitches are structured to receive only one shank size of a variety of existing shank sizes, the plurality of interchangeable towing assemblies 76 may include more than one swivel shank assembly 150, each structured to accommodate a particular size of conventional receiver hitch that may be present in a towing hitch apparatus.

Each swivel shank assembly 150 includes a rearwardly-extending coupler 152 with one or more vertically-oriented orifices 154 and aligned vertically-oriented orifices 156 through an adapter 158 thereof, the coupler 152 being dimensioned and profiled to be slidingly insertable through front opening 30 of body member 22 and into body member 22.

Preferably, swivel shank assembly 150 has a protrusion 160 spaced such that orifices 154 are aligned with orifices 84 of upper and lower sides 24, 26 of body member 22 when protrusion 160 abuts body member 22. Swivel shank assembly 150 includes a fastener 162 through orifices 156 of adapter 158 when aligned with orifice 166 of pivot lug 168 to thereby operatively establish a yaw axis 170 as indicated in FIG. 4.

Similarly, a fastener 172 through orifice 174 of pivot lug 168 and orifices 176 of yoke 178 operatively establishes a pitch axis 180 as indicated in FIG. 4. Finally, a fastener 182 through orifice 184 of yoke 178 and orifice 186 of end wall 188 of shank 190 operatively establishes a roll axis 192 as indicated in FIG. 4. A pin 194 through aligned orifices of shank 190 and aligned with orifices of a conventional receiver hitch of a towing hitch apparatus (not shown) releasably secure the swivel shank assembly 150 to a towing vehicle.

The plurality of interchangeable towing assemblies 76 may further include an interchangeable towing assembly having a universal swivel clevis configuration 200 as shown in an exploded view in FIG. 5. Interchangeable swivel clevis assembly 200 would be selected when a user desires to connect tow bar 10 to a towing hitch apparatus with a drawbar or other similar connecting apparatus (not shown).

Each swivel clevis assembly 200 includes a rearwardly-extending coupler 202 with one or more vertically-oriented orifices 204 and a horizontally-oriented orifice 206, the coupler 202 being dimensioned and profiled to be slidingly insertable through front opening 30 and into body member 22. Preferably, swivel clevis assembly 200 has a protrusion 208 spaced such that orifices 204 are aligned with orifices 84 through the upper and lower sides 24, 26 of body member 22 when the protrusion 208 abuts body member 22. Swivel clevis assembly 200 includes a fastener 210 inserted through aligned orifices 212 of yoke 214 and orifice 206 of coupler 202 to thereby operatively establish a pitch axis 216 as indicated in FIG. 5.

Similarly, a fastener 218 through orifice 220 of yoke 214 and orifice 222 of end wall 224 of clevis connector 226 establishes a roll axis 228 as indicated in FIG. 5. Finally, a fastener 230 through aligned orifices 232 of clevis connector 226 and a drawbar of a towing hitch apparatus (not shown) operatively establishes a yaw axis 234 as shown in FIG. 5.

The present invention further includes a storage mechanism 236 which enables positioning tow bar 10 in a stored configuration as shown in FIG. 6. A towed hitch apparatus of a towed vehicle typically includes a baseplate connector having a pair of attachment tabs 252, 254 with aligned orifices 256, 258, respectively. Attachment tabs 252, 254 are secured to, and extend outwardly from baseplate connector 260 with one of the attachment tabs 252 positioned toward the driver's side of the vehicle and the other attachment tab 254 positioned toward the passenger's side of the vehicle.

While the towed vehicle is being towed by a towing vehicle, rear connector 66 connected to leg 36 is pivotally connected to attachment tab 252 by pins 262, 264, and rear connector 66 connected to leg 38 is pivotally connected to attachment tab 254 by pins 266, 268 or other suitable devices.

When preparing tow bar 10 for storage, rear connector 66 connected to leg 36 remains connected to attachment tab 252, but pins 266, 268 are temporarily removed from the rear connector 66 connected to leg 38, thereby releasing leg 38 from attachment tab 254. Leg 38 is then pivoted to a position alongside leg 36 (see arrow 53 in FIG. 1) to thereby enable insertion of leg support 272 (see FIG. 7) through orifices 274 of rear connector 66 of leg 38 (see FIG. 2), which was vacated by pin 266. Pin 276 is then inserted through orifice 278 in the distal end of leg support 272 to thereby secure leg 38 to leg 36. Pin 266 is then inserted through orifice 280 of storage bracket 282 (see FIGS. 1, 6 and 8), which is secured by U-bolt 284 to leg 36, then through orifices 258 of attachment tab 254, and secured by pin 268 to thereby secure tow bar 10 to baseplate connector 260 for convenient storage beneath baseplate connector 260 as shown in FIGS. 6 through 9. Bracket 282 is shown in FIGS. 1, 6, and 8. U-bolt 284 allows bracket 282 to be adjusted to accommodate baseplate connectors 260 having different spacings between attachment tabs 252, 254.

For some applications of the present invention, it may be desirable to separately pivotally mount each of the two legs 36, 38 to body member 22 as shown in FIG. 9. In that event, the proximal end of each leg is mounted with a fastener 286 through respective aligned orifices as hereinbefore described for leg 36. A pair of aligned arcuate slots 288 are provided in the upper and lower sides 24, 26 of the body member 22 for each of legs 36, 38. A fastener 290 through each pair of aligned arcuate slots 288 pivotally mounts legs 36, 38 to the body member 22 as hereinbefore described for leg 38.

Fasteners 290 are positioned in arcuate slots 288 such that legs 36,38 are operatively equiangularly-spaced relate to a straight-away roll axis between the towing and towed vehicles to thereby ensure that loading is operatively applied substantially equally to legs 36, 38 and to ensure that the towed vehicle operatively and closely track on center behind the towing vehicle.

Preferably, after rear connectors 66 are appropriately spaced apart to accommodate the spacing between attachment tabs 252, 254 of the baseplate connector 260 of a towed hitch apparatus, one of fasteners 290 is securely tightened to prevent legs 36, 38 from operatively pivoting relative to body member 22 to thereby avoid swaying and fishtailing of the towed vehicle relative to a towing vehicle. By so tightening only one of fasteners 290, leg 36 or 38 can still be pivoted without using tools to pivot tow bar 10 to the storage configuration. Further by loosening tightened fastener 290, both legs 36, 38 can again be temporarily pivoted relative to body member 22 thereby allowing a user to adjust tow bar 10 to accommodate a different towed vehicle having a baseplate connector 260 with a different spacing between attachment tabs 252, 254 thereof.

As an example of an application of the present invention, assume that tow bar 10 is connected to and conveniently stored at the front of a towed vehicle, and further assume that the configuration of the towing assembly attached to tow bar 10 is not appropriate for the towing hitch apparatus.

First, the towing assembly of the tow bar 10 is disconnected from the towing hitch apparatus. Then, pins 266, 268 are removed from the rear connector 66 that is secured to leg 38, thereby allowing leg 38 to be released from baseplate connector 260 of the towed hitch apparatus. Leg 38 is then pivoted to a position alongside leg 36 so leg support 272 secured to rear connector 66 of leg 36 can be inserted through orifice 274 of rear connector 66 of leg 38. One or both latches 68 may need to be released in order to so insert leg support 272. Pin 276 is inserted through the distal end of leg support 272 to secure rear connector 66 of leg 38 to rear connector 66 of leg 36.

Body member 22 is then pivoted such that orifice 280 of the storage bracket 282 is aligned with orifices 258 of attachment tab 254. Pin 266 is inserted through orifices 258, 280 to secure tow bar 10 to attachment tab 254. Finally, pin 268 is inserted through the distal end of pin 266 to secure tow bar 10 to baseplate connector 260 to thereby conveniently position tow bar 10 in an out-of-the-way storage configuration.

It is to be understood that while certain forms of the present invention have been illustrated and described herein, it is not to be limited to the specific forms or arrangement of parts as described and shown.

What is claimed is:

1. A tow bar for connecting a towed hitch apparatus of a towed vehicle to a towing hitch apparatus of a towing vehicle, the tow bar comprising:
  (a) a towed portion structured and configured to be releasably connectable to a towed hitch apparatus of a towed vehicle, the towed portion including:
    (1) a body member; and
    (2) a pair of legs, each leg having:
      (A) an outer member with a proximal end connected to the body member and a distal end, wherein at least one of the outer members is pivotally connected to the body member, and
      (B) an inner member with a proximal end telescopingly and longitudinally displaceable in the distal end of the outer member, and a distal end with a rear connector releasably connectable to the towed hitch apparatus of the towed vehicle;
  (b) a towing portion structured and configured to be releasably connectable to a towing hitch apparatus of a towing vehicle, the towing portion including:
    (1) a plurality of interchangeable towing assemblies, each interchangeable towing assembly structured and configured to be releasably connectable to a different type and/or size of towing hitch apparatus of a towing vehicle, the plurality of interchangeable towing assemblies including two or more of the following:
      (A) an interchangeable towing assembly with a lunette ring configuration,
      (B) an interchangeable towing assembly with a universal swivel clevis configuration,
      (C) one or more interchangeable towing assemblies with a hitch ball receiver configuration, and
      (D) one or more interchangeable towing assemblies with a universal swivel shank configuration,
    (2) wherein each of the interchangeable towing assemblies is structured and configured to releasably connect the body portion of the towed portion to the towing hitch apparatus of the towing vehicle;
  (c) an attaching portion structured and configured to releasably connect each interchangeable towing assembly of the plurality of interchangeable towing assemblies to the body member of the towed portion, the attaching portion including:
    (1) the body member having a front end with an opening, upper and lower sides, and at least one aligned pair of orifices through the upper and lower sides,
    (2) each interchangeable towing assembly having a rearwardly-extending coupler with at least one vertically-oriented orifice corresponding to the at least one aligned pair of orifices through the upper and lower sides of the body member, the coupler being dimensioned and profiled to be slidingly insertable through the front opening of the body member and into the body member, the coupler having a protrusion positioned wherein the at least one pair of orifices through the upper and lower sides of the body member and the at least one orifice of the coupler are aligned when the protrusion abuts the body member, and
    (3) a pin, insertable through each at least one pair of orifices through the upper and lower sides of the body member when aligned with the at least one orifice of the coupler, to thereby releasably secure the coupler to the body member; and
  (d) a storage mechanism structured and configured to releasably connect the tow bar to a baseplate connector of the towed hitch apparatus of the towed vehicle in a stored configuration, the storage mechanism including:
    (1) a leg support structured to enable releasable connection of the distal ends of the legs to one tab of a baseplate connector of the towed hitch apparatus of the towed vehicle, and
    (2) a storage bracket structured to enable releasable connection of the proximal ends of the legs to another tab of the baseplate connector of the towed hitch apparatus of the towed vehicle.

2. A tow bar for connecting a towed vehicle to a towing vehicle, the tow bar comprising:
  (a) a towing portion structured and configured to be releasably connectable to a towing hitch apparatus of a towing vehicle;
  (b) a towed portion structured and configured to be releasably connectable to a towed hitch apparatus of a towed vehicle; the towed portion including:
    (1) a body member; and
    (2) a pair of legs, each leg having:
      (A) an outer member with a proximal end connected to the body member and a distal end, wherein at least one of the outer members is pivotally connected to the body member, and
      (B) an inner member with a proximal end telescopingly and longitudinally displaceable in the distal end of the outer member, and a distal end with a rear connector releasably connectable to the towed hitch apparatus; and
  (c) an attaching portion structured and configured to releasably connect the towing portion to the towed portion;
  (d) wherein the towing portion includes a plurality of interchangeable towing assemblies, each interchangeable towing assembly being structured to be releasably connectable to a different type and/or size of towing hitch apparatus.

3. A tow bar as described in claim 2, wherein the plurality of interchangeable towing assemblies includes at least one interchangeable towing assembly having a lunette ring configuration.

4. A tow bar as described in claim 2, wherein the plurality of interchangeable towing assemblies includes at least one interchangeable towing assembly having a universal swivel clevis configuration.

5. A tow bar as described in claim 2, wherein the plurality of interchangeable towing assemblies includes at least one interchangeable towing assembly having a universal hitch ball receiver configuration.

6. A tow bar as described in claim 5, wherein each at least one interchangeable towing assembly having a universal hitch ball receiver configuration is structured to accommodate a towing hitch apparatus with a hitch ball having a different diameter.

7. A tow bar as described in claim 2, further comprising a storage mechanism including:

(a) a leg support structured to enable releasable connection of the distal ends of the legs to one tab of a baseplate connector of a towed hitch apparatus of a towed vehicle, and (b) a storage bracket structured to enable releasable connection of the proximal ends of the legs to another tab of the baseplate connector of the towed hitch apparatus of the towed vehicle.

8. A tow bar for connecting a towed vehicle to a towing vehicle, the tow bar comprising:

(a) a towing portion structured and configured to be releasably connectable to a towing hitch apparatus of a towing vehicle, the towing portion including a plurality of interchangeable towing assemblies each structured to be releasably connectable to a different type and/or size of towing hitch apparatus;

(b) a towed portion structured and configured to be releasably connectable to a towed hitch apparatus of a towed vehicle; and (c) an attaching portion structured and configured to releasably connect the towing portion to the towed portion, the attaching portion including:

(1) the towed portion having a body member with a front end with an opening, upper and lower sides, and at least one aligned pair of orifices through the upper and lower sides, (2) each interchangeable towing assembly of the plurality of towing assemblies having a rearwardly-extending coupler with at least one vertically-oriented orifice corresponding to the at least one aligned pair of orifices through the upper and lower sides of the body member, the coupler being dimensioned and profiled to be slidingly insertable through the opening of the front end of the body member and into the body member, the coupler having a protrusion positioned wherein the at least one pair of orifices through the upper and lower sides of the body member and the at least one orifice of the coupler are aligned when the protrusion abuts the body member, and (3) a pin, insertable through each at least one pair of orifices through the upper and lower sides of the body member when aligned with the at least one orifice of the coupler, to thereby releasably secure the coupler to the body member.

\* \* \* \* \*